(12) United States Patent
Shmilovich et al.

(10) Patent No.: US 11,628,929 B2
(45) Date of Patent: Apr. 18, 2023

(54) AIR ACCELERATION AT SLOT OF WING

(71) Applicant: The Boeing Company, Chicago, IL (US)

(72) Inventors: Arvin Shmilovich, Huntington Beach, CA (US); Abdollah Khodadoust, Long Beach, CA (US); Christopher Colletti, Urbana, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/506,589

(22) Filed: Oct. 20, 2021

(65) Prior Publication Data

US 2022/0194562 A1 Jun. 23, 2022

Related U.S. Application Data (60) Provisional application No. 63/130,243, filed on Dec. 23, 2020.

(51) Int. Cl.
*B64C 21/02* (2006.01)

(52) U.S. Cl.
CPC ................. *B64C 21/025* (2013.01)

(58) Field of Classification Search
CPC ......... B64C 21/02; B64C 21/04; B64C 21/06; B64C 21/025
See application file for complete search history.

(56) References Cited

U.S. PATENT DOCUMENTS

| | | | | |
|---|---|---|---|---|
| 3,051,413 A | * | 8/1962 | Pouit | B64C 23/005 244/12.5 |
| 3,055,614 A | * | 9/1962 | Thompson | B64C 23/005 244/15 |
| 3,161,377 A | * | 12/1964 | Balluff | B64C 9/38 244/12.5 |
| 4,666,104 A | * | 5/1987 | Kelber | B64C 21/06 244/209 |
| 7,150,432 B2 | * | 12/2006 | Ouellette | B64D 27/18 244/54 |
| 8,827,212 B1 | * | 9/2014 | Shmilovich | B64C 21/08 244/207 |
| 9,714,082 B2 | * | 7/2017 | Shmilovich | B64C 21/08 |
| 10,308,350 B2 | * | 6/2019 | Shmilovich | B64C 21/08 |
| 10,526,072 B2 | * | 1/2020 | Shmilovich | G05D 7/0664 |
| 2007/0290098 A1 | * | 12/2007 | Novak | B64C 9/20 244/12.6 |
| 2009/0108125 A1 | * | 4/2009 | Shmilovich | B64C 21/04 244/15 |
| 2011/0108672 A1 | * | 5/2011 | Shmilovich | B64C 9/18 244/207 |
| 2012/0256049 A1 | * | 10/2012 | Shmilovich | B64C 23/06 244/1 N |

(Continued)

*Primary Examiner* — Tye William Abell
(74) *Attorney, Agent, or Firm* — Duft & Bornsen, PC (57) ABSTRACT

Air acceleration at slot of aircraft wing. In one embodiment, a wing includes an air duct configured to transport air in a spanwise direction along a leading edge of the wing from an air supply source of the aircraft. The wing further includes a discharge duct configured to transport the air in an aft direction from the air duct to an aft end of the wing, and one or more nozzles disposed on the aft end of the wing and configured to accelerate air into a slot between the wing and a flap of the aircraft to increase lift and reduce drag for the wing.

20 Claims, 8 Drawing Sheets

(56) References Cited

U.S. PATENT DOCUMENTS

| | | | | |
|---|---|---|---|---|
| 2014/0119878 A1* | 5/2014 | Shmilovich | ............ | B64C 21/04 |
| | | | | 415/115 |
| 2016/0375987 A1* | 12/2016 | Shmilovich | ............... | B64C 9/38 |
| | | | | 244/207 |
| 2017/0297680 A1* | 10/2017 | Shmilovich | ........... | F15B 21/042 |
| 2020/0391853 A1* | 12/2020 | Shmilovich | ............ | B64C 21/08 |

* cited by examiner

FIG. 8

AIR ACCELERATION AT SLOT OF WING

RELATED APPLICATIONS

This non-provisional patent application claims priority to U.S. Provisional Patent Application No. 63/130,243 filed on Dec. 23, 2020, which is incorporated by reference as if fully provided herein.

GOVERNMENT LICENSE RIGHTS

This invention was made with government support under ULI NASA contract —A18-0139-5007. The government has certain rights in the invention.

FIELD

This disclosure relates to the field of aircraft, and more particularly, to aircraft wing lift and drag performance.

BACKGROUND

The wing of an aircraft may include a drooped leading edge and/or slotted-wing configuration for improved flight aerodynamics. However, while such configurations provide certain aerodynamic improvements, they include drawbacks at low-speed operations and for integrating anti-ice features for the wing. Aircraft manufacturers thus continue to seek wing arrangements that provide increased lift-to-drag ratio for improved flight performance and system integration.

SUMMARY

Provided herein are systems and method for air acceleration at the slot of a wing. One or more nozzles are disposed at the slot between the wing and flap to improve aerodynamic performance. In particular, the nozzle accelerates air such as from an air supply source of the aircraft (e.g., anti-ice system) or an inlet port and compressor assembly, and ejects the air into the slot for increased lift and reduced drag. Consequently, the improvement in the lift-to-drag ratio enables higher load carrying capacity, shorter runway lengths, and longer range.

One embodiment is a wing that includes an air duct configured to transport air in a spanwise direction along a leading edge of the wing from an air supply source of the aircraft. The wing further includes a discharge duct configured to transport the air in an aft direction from the air duct to an aft end of the wing, and one or more nozzles disposed on the aft end of the wing and configured to accelerate air into a slot between the wing and a flap of the aircraft to increase lift and reduce drag for the wing.

One embodiment is a wing including a slot between a main wing element and a flap. The wing includes an inlet port configured to suction a viscous layer of a lower surface of the wing, and a compressor configured to pressurize/accelerate the air from the inlet port. The wing further includes an ejection port configured to eject the pressurized air into the slot to increase lift and reduce drag for the wing.

One embodiment is a method of improving aerodynamic airflow for a wing of an aircraft. The method includes transporting air toward an ejection port disposed at a surface of the wing facing a slot between a main wing element and a flap, and ejecting the air into the slot to increase lift and reduce drag for the wing.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
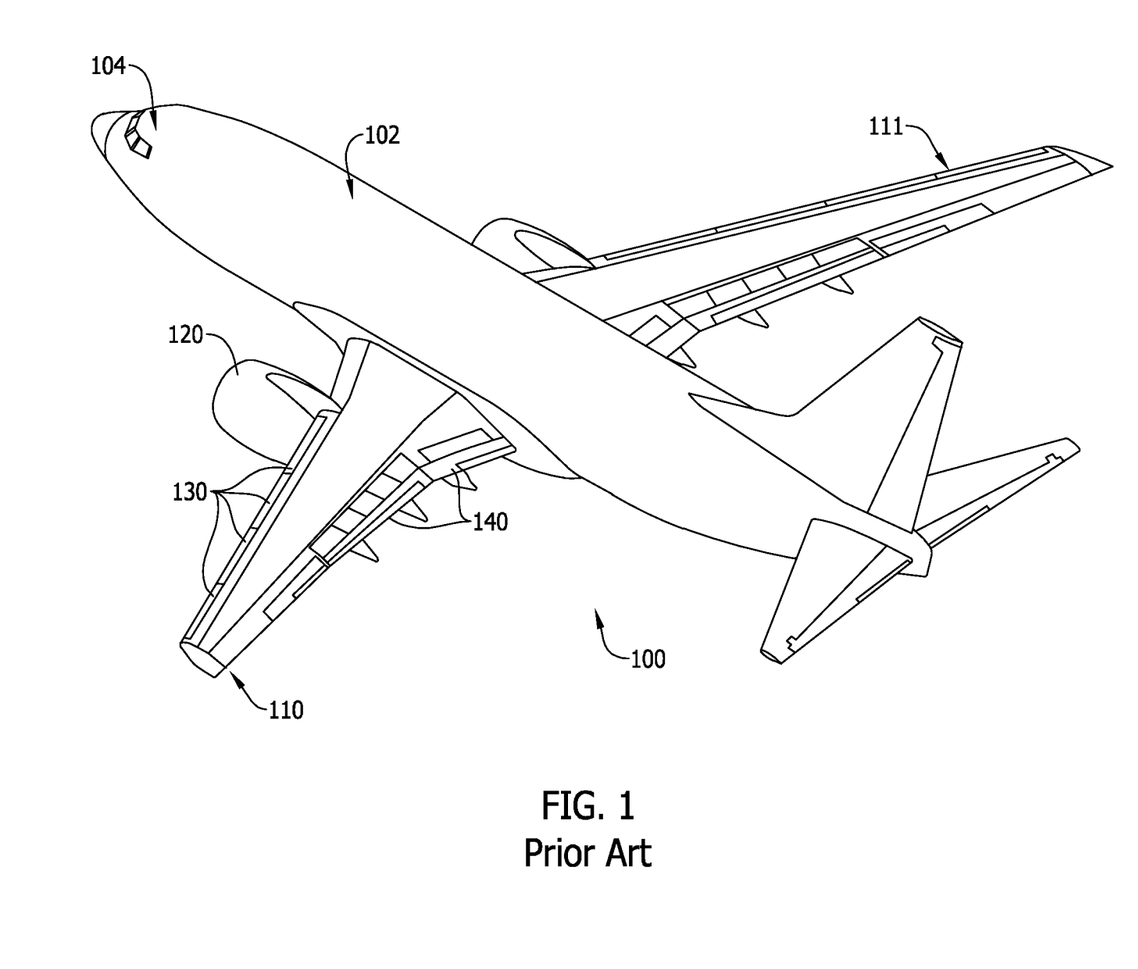
FIG. 1 is a perspective view of an aircraft.

FIG. 1 is a perspective view of an aircraft 100. Aircraft 100 includes fuselage 102, which comprises the main body of aircraft 100. Cockpit 104 is situated at the nose or front of fuselage 102 and houses the pilot that controls flight of aircraft 100. A pair of wings 110-111 project outward from fuselage 102 to provide lift for aircraft 100, and one or more engines 120 provide thrust. Aircraft 100 further includes various flight control surfaces to control the position and speed of aircraft 100. In particular, each wing 110-111 may include one or more slats 130 along the wing leading edge and one or more flaps 140 along the wing trailing edge to provide increased lift for aircraft 100 during low-speed operations, such as takeoff and landing.

Figure 2:
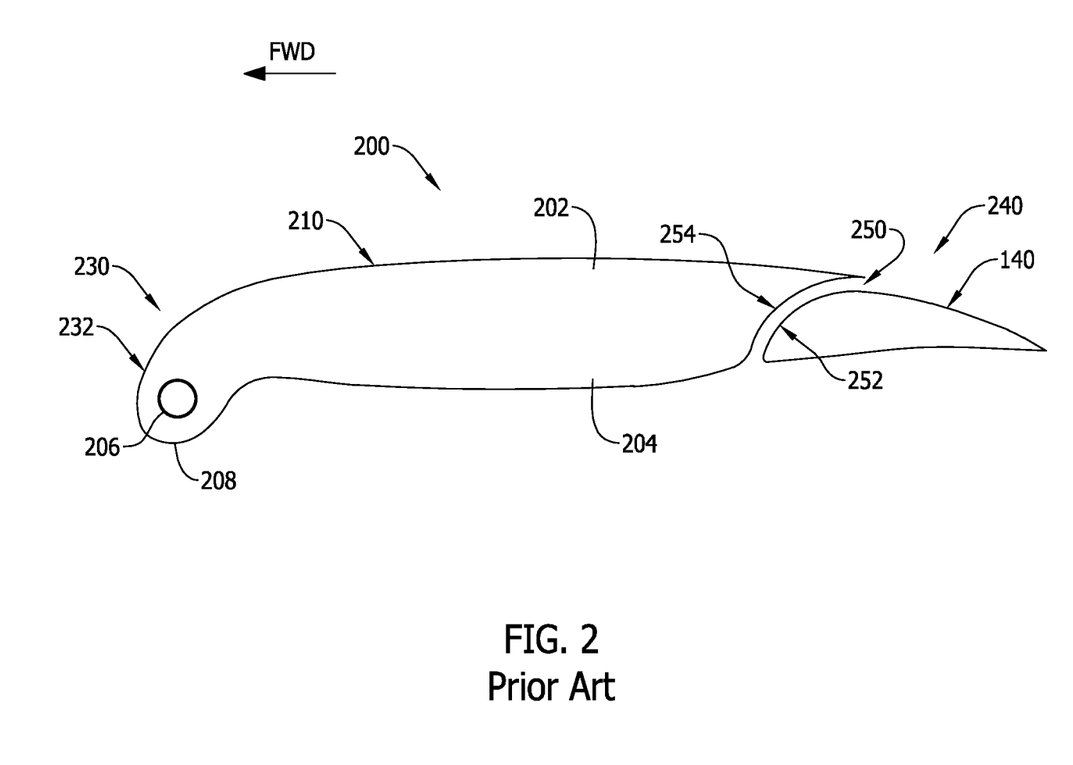
FIG. 2 is a side view of a wing.

FIG. 2 is a side view of a wing 200. The wing 200 generally includes a leading edge 230, a main wing element 210, and one or more flaps 140 mounted at a trailing edge 240. The wing 200 of this example includes a leading edge 230 in a drooped configuration 232. Benefits of the drooped configuration 232 include improved aerodynamic performance and stall capability. Additionally, the wing 200 includes a geometry that promotes extended natural laminar flow along both the upper surface 202 and lower surface 204 for lower skin friction drag. Compared with conventional turbulent flow wings, natural laminar flow wings have shown to have a reduction in profile drag up to 50%. Still further, the wing 200 also includes slot 250, or gapped opening, which provides aerodynamic performance advantages including improved transonic cruise conditions. The slot 250 works to restart the boundary layer along the aft element (e.g., forward end 252 or surface of flap 140) while also relaxing pressure recovery along the fore element (e.g., aft end 254 or surface of main wing element 210).

Still further, the wing 200 may include an air duct 206 spanwise along the leading edge 230 as part of a wing anti-ice feature. The air duct 206 transports hot air from an engine compressor to prevent the formation of frost and ice on the wing skin structure to preserve the aerodynamic shape in cold external environments. A hollow space, or internal area, within skin structure temporarily contains the hot air before it exits into the external environment via vent hole 208 on the underside of the wing 200. Unfortunately, the natural laminar flow design of the wing 200 may be disrupted by the surface discontinuities introduced by the vent hole 208. Additionally, as the angle of attack increases, the growing adverse pressure recovery leads to a rapid separation starting along the leading edge 230, thus reducing high-lift performance during takeoff and landing.

Figure 3:
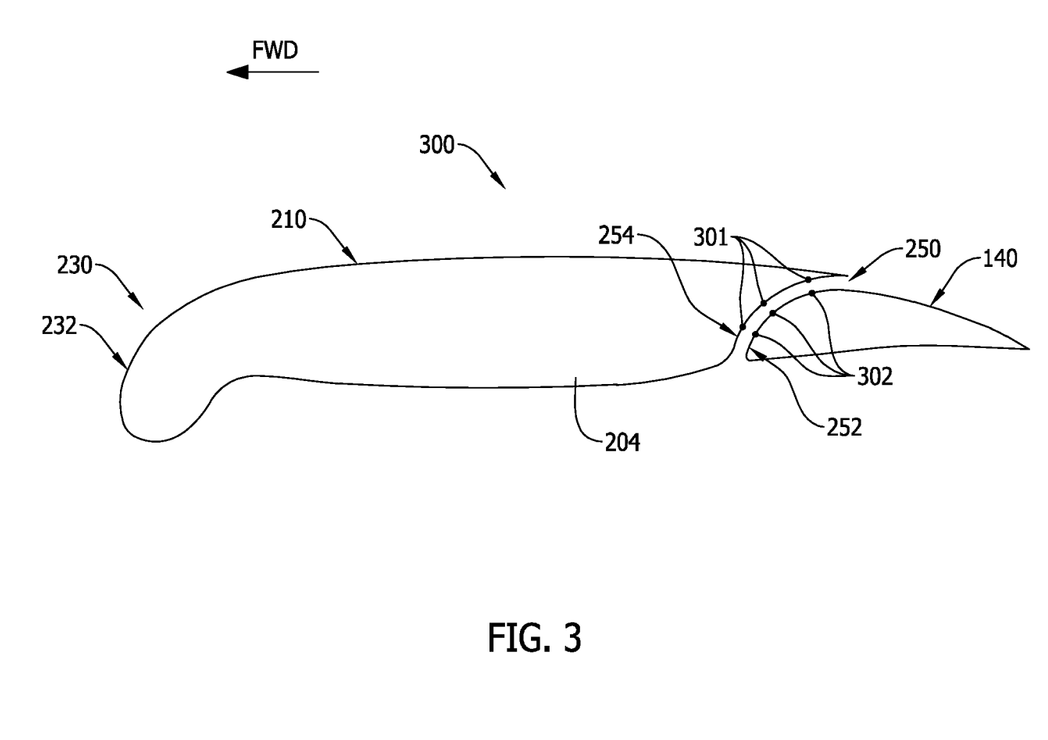
FIG. 3 is a side view of a wing in an illustrative embodiment.

FIG. 3 is a side view of a wing 300 in an illustrative embodiment. The wing 300 is enhanced with one or more ports 301-302 arranged along the slot 250 configured to increase lift and reduce drag for the wing 300 and to delay stalling through boundary layer control. As described in greater detail below, the ports 301-302 may compensate for shortcomings in aerodynamic performance during low-speed operations due to the drooped configuration 232 of the leading edge 230 without disrupting laminar flow along a surface (e.g., lower surface 204) of the wing 300.

In one embodiment, the ports 301-302 may comprise a combination of one or more suction ports and one or more ejection ports as part of an assembly that ingests air, pressurizes the air, and ejects the air back into the slot 250 to alter the external flow structure during low-speed operations to reduce drag, increase lift, and improve stall capability. In an alternative embodiment, one or more of ports 301-302 may apply air from the anti-ice system of the aircraft (which would otherwise be wasted through the vent hole 208 as discussed in FIG. 2) to increase the lift-to-drag ratio (L/D) for improved payload, range, and stall capability of the aircraft. This provides an additional benefit of potentially enabling a reduction in the engine core size and engine rating resulting in a lower weight of the aircraft, which can lead to lower fuel consumption and reduced emissions. Although shown and described with respect to a slotted-wing configuration, embodiments herein may similarly apply to non-slotted wings in which the wing effectively becomes slotted during high-lift operations as the flaps are deployed. Details of various embodiments are described below.

Figure 4:
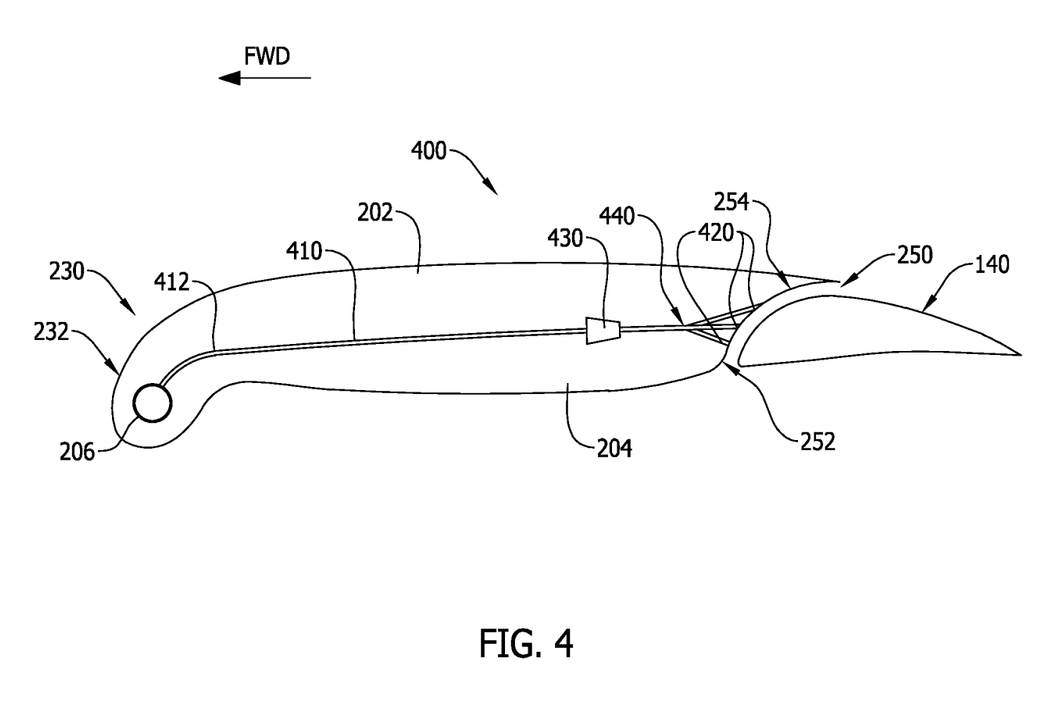
FIG. 4 is a side view of a wing in another illustrative embodiment.

FIG. 4 is a side view of a wing 400 in another illustrative embodiment. In this example, the wing 400 includes an air duct 206 configured to transport air in a spanwise direction along a leading edge 230 of the wing 400 from an air supply source (e.g., anti-ice system) of the aircraft. The wing 400 also includes a discharge duct 410 configured to transport the air in an aft direction from the air duct 206 to an aft end 254 of the wing 400. One or more nozzles 420 disposed on the aft end 254 are configured to accelerate air into the slot 250 between the wing 400 and flap 140 to increase lift and reduce drag for the wing 400. In addition to the technical benefits previously described, this allows for elimination of the vent hole 208 at the leading edge 230 (see FIG. 2) to maintain the laminar flow benefits of the wing 400 while not only exhausting the anti-ice fluid but doing so in a manner that improves aerodynamic performance.

The air supply source may include one or more of a wing anti-ice system, an auxiliary power unit, an engine anti-ice system, an engine bleed, and/or a cabin air compressor. In some embodiments, the wing 400 includes a compressor 430 coupled with the discharge duct 410 and configured to accelerate the air toward the slot 250. The wing 400 may further include nozzle manifold 440 configured to transport the air from the discharge duct 410 to multiple nozzles 420 at the aft end 254. Moreover, in some embodiments, the wing 400 includes a flexible duct section 412 configured to transport the air from the air duct 206 to the discharge duct 410. As previously described, the leading edge 230 may include a drooped configuration 232, and the discharge system of the wing 400 advantageously maintains the laminar flow design benefits of the wing 400 while improving the low-speed aerodynamics of the drooped configuration 232. In other words, the one or more nozzles 420 accelerate the air into the slot 250 to compensate for the shortfall in aerodynamic performance due to the drooped configuration 232 without disrupting laminar flow along a surface of the wing 400.

Figure 5:
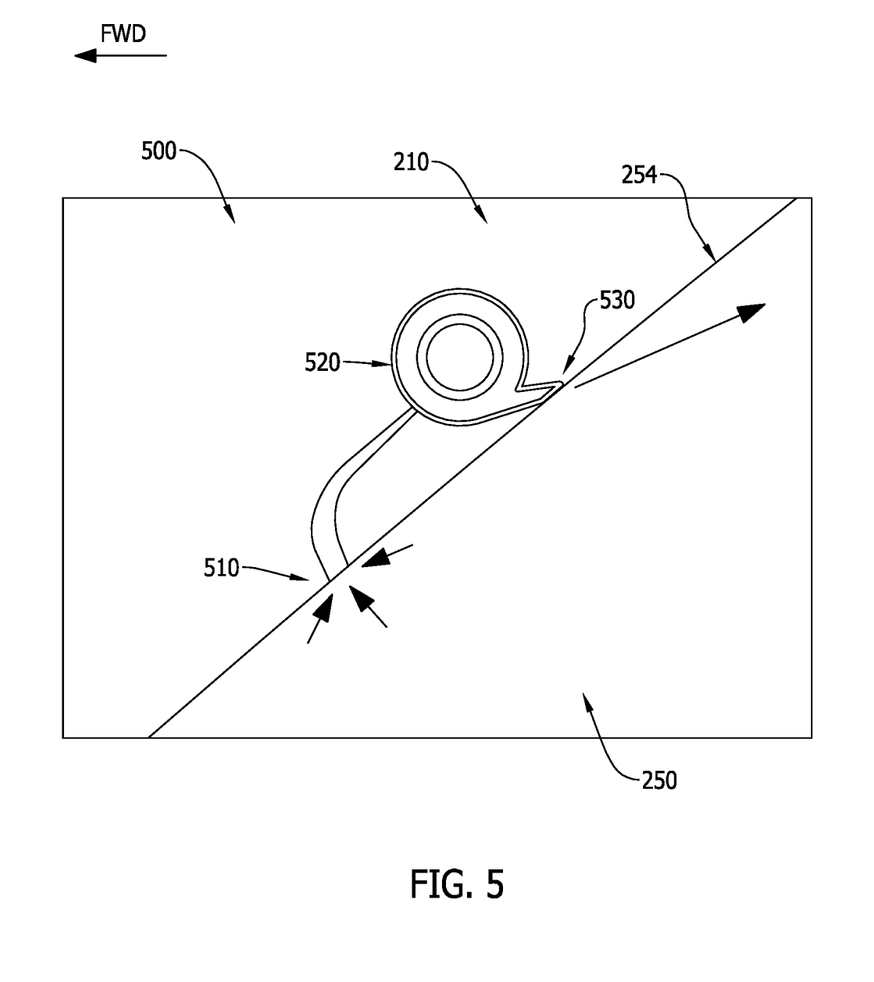
FIG. 5 is a close-up view of a wing enhanced with active flow control in another illustrative embodiment.

FIG. 5 is a close-up view of a wing 500 enhanced with active flow control in another illustrative embodiment. As previously described, the wing 500 may include a slot 250 between the main wing element 210 and flap (not shown in FIG. 5). In this example, the wing 500 includes an inlet port 510 configured to suction the viscous layer of a lower surface (e.g., lower surface 204) of the wing 500. As air travels from the leading edge 230 and along the lower surface 204, friction causes a viscous layer to develop which translates to viscous drag. The inlet port 510 ingests the viscous layer at the slot 250 to help reduce this drag component.

Furthermore, wing 500 includes a compressor 520 configured to pressurize the air suctioned by the inlet port 510. The wing 500 also includes an ejection port 530 configured to eject the pressurized air into the slot 250 to increase lift and reduce drag for the wing 500. In one embodiment (and as shown in FIG. 5), the inlet port 510 and the ejection port 530 are disposed at the aft end 254 of the main wing element 210. Alternatively or additionally, the inlet port 510 and the ejection port 530 may be disposed at the forward end 252 of the flap 140 (not shown in FIG. 5). For example, in one embodiment, a first inlet port and a first ejection port are disposed at the aft end 254 of a main wing element 210, and a second inlet port and a second ejection port are disposed at the forward end 252 of the flap 140. Respective compressors 520 may be disposed within the main wing element 210 and flap 140.

Figure 6:
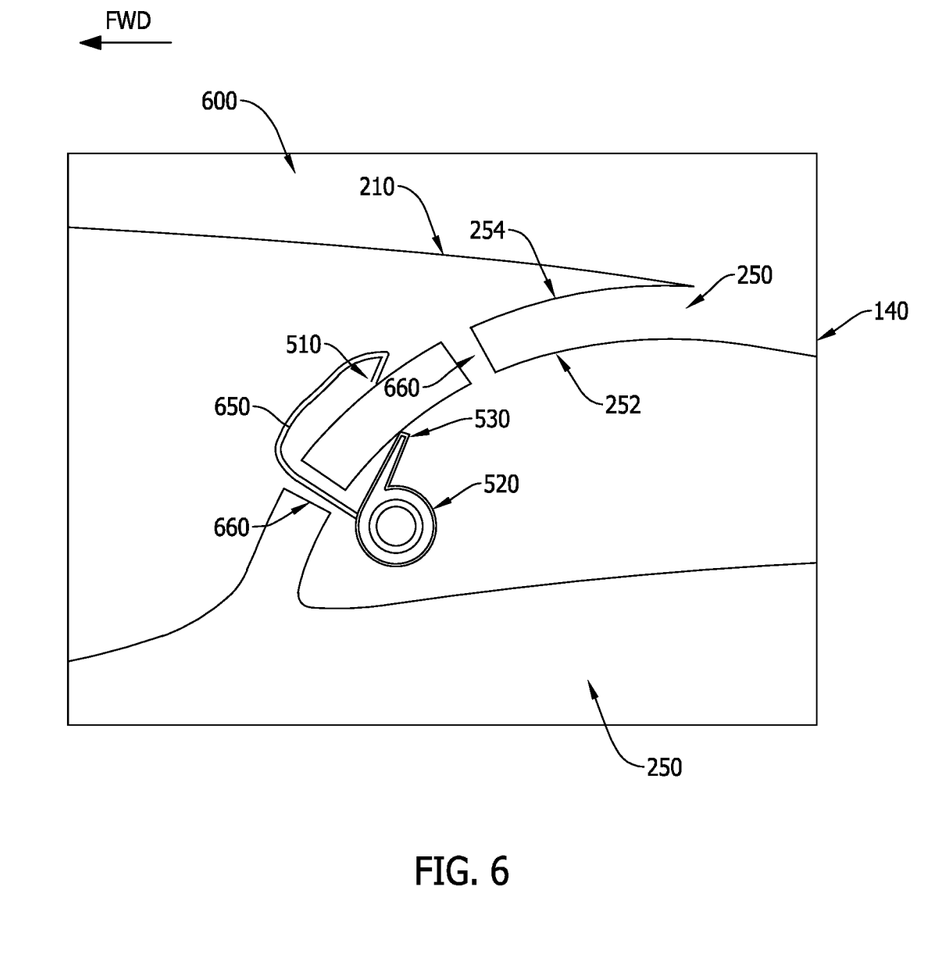
FIG. 6 is a close-up view of a wing enhanced with active flow control in yet another illustrative embodiment.

FIG. 6 is a close-up view of a wing 600 enhanced with active flow control in yet another illustrative embodiment. In this example, the inlet port 510 is disposed at the aft end 254 of a main wing element 210, the compressor 520 is disposed in the flap 140, and the ejection port 530 is disposed at the forward end 252 of the flap 140. The wing 600 further includes a bridging duct 650 configured to transport the air across the slot 250 from the inlet port 510 to the compressor 520. The bridging duct 650 is disposed within an aft-element support strut 660 extending across the slot 250 between the main wing element 210 and the flap 140. In some embodiments, the bridging duct 650 is a flexible duct in case the flap 140 is deflected. Generally, the ejection port 530 is oriented to accelerate the air into the slot 250 in an upward direction to improve aerodynamic performance.

Figure 7:
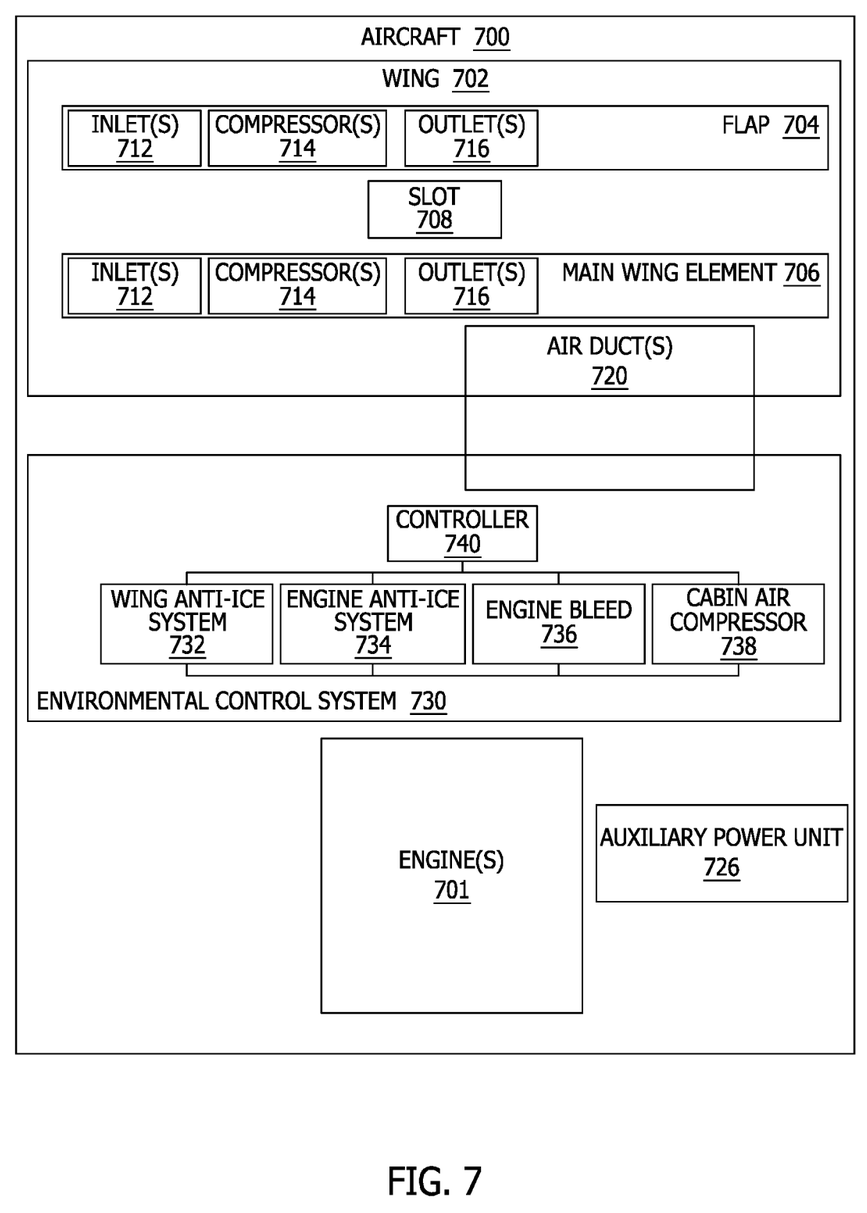
FIG. 7 is a block diagram of an aircraft in an illustrative embodiment.

FIG. 7 is a block diagram of aircraft 700 in an illustrative embodiment. Aircraft 700 may comprise a commercial aircraft as shown in FIG. 1, or another type of aircraft that uses nozzle acceleration for its drooped leading edge slotted wing configuration. Aircraft 700 may include numerous components that are not shown or described for the sake of brevity. In this embodiment, aircraft 700 includes one or more engines 701 and wings 702. Engines 701 provide thrust for aircraft 700, and may comprise combustion engines (e.g., jet engines), electric engines, and/or hybrid electric engines.

The wing 702 may include a main wing element 706 and one or more flaps 704 such as that shown in FIGS. 3-6. Each main wing element 706 and/or flap 704 may include one or multiple inlets 712, compressors 714, and/or outlets 716. The outlets 716, or nozzles, may accelerate air into a slot 708 between the flap 704 and the main wing element 706. Each inlet 712 may receive or ingest air traveling in an external environment of the aircraft 700. Alternatively or additionally, outlets 716 may receive air via one or more air ducts 720 extending through the slat (not shown) or main wing element 706. Air duct 720 may transport air generated from engine 701 or an auxiliary power unit 726 of aircraft 700. More particularly, air duct 720 may comprise a component of or coupled with a component of an environmental control system 730 of aircraft 700. Air sources of environmental control system 730 include wing anti-ice system 732, engine anti-ice system 734, engine bleed 736, and cabin air compressor 738.

Transportation of air throughout aircraft 700 may be selectively controlled by controller 740. Controller 740 is implemented on a hardware platform comprised of analog circuitry, digital circuitry, and/or a processor that executes instructions stored in memory. A processor comprises an integrated hardware circuit configured to execute instructions, and a memory is a non-transitory computer readable storage medium for data, instructions, applications, etc., and is accessible by the processor. In one embodiment, controller 740 is configured to actuate valves to control airflow through air duct 720 and/or outlets 716. In some embodiments, each subsystem of environmental control system 730 includes its own controller for air control, and controller 740 coordinates the different air supply sources to control the flow to the active flow control ducting and outlet 716.

Figure 8:
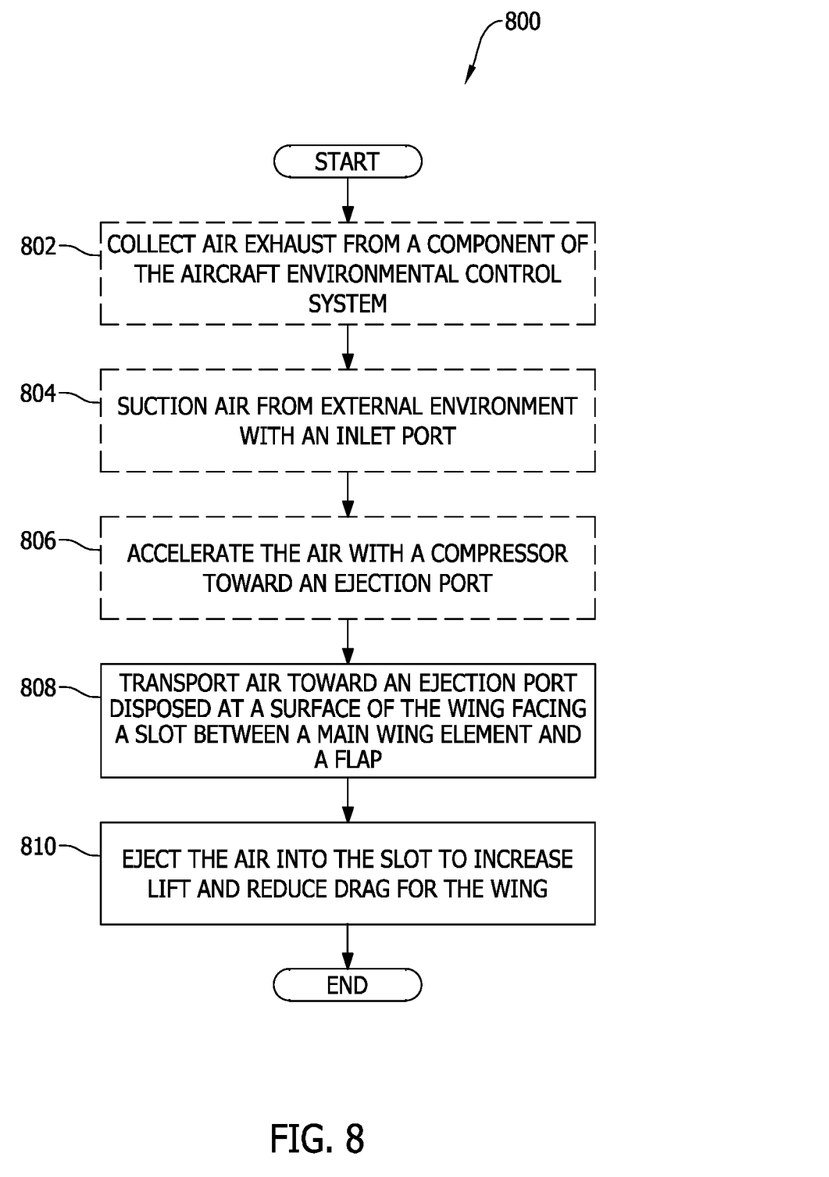
FIG. 8 is a flow chart illustrating a method of improving aerodynamic airflow for an aircraft in an illustrative embodiment.

FIG. 8 is a flow chart illustrating a method 800 of improving aerodynamic airflow for an aircraft in an illustrative embodiment. The steps of method 800 will be described with respect to FIGS. 3-7, although one skilled in the art will understand that the methods described herein may be performed on other types of aircraft and wings. The steps of the methods described herein are not all inclusive and may include other steps not shown. The steps for the flow charts shown herein may also be performed in an alternative order.

In optional step 802, an air supply source of the aircraft (e.g., auxiliary power unit 726, wing anti-ice system 732, engine anti-ice system 734, engine bleed 736, or cabin air compressor 738) transports air to the wing 702. Alternatively or additionally, in optional step 804, one or more inlets 712 suction air from an external environment. Further, in optional step 806, a compressor 714 (e.g., compressor 520/430) accelerates air toward one or more outlets 716 or ejection ports.

In step 808, the air is transported toward an ejection port disposed at a surface of the wing 702 facing a slot 708 between a main wing element 706 and flap 704. In some embodiments, the air is transported with a discharge duct 410 in an aft direction from an air supply source of the aircraft 700 toward an aft end 254 of the main wing element 706. In step 810, the air is ejected into the slot 708 to increase lift and reduce drag for the wing 702. In one embodiment, the air is ejected into the slot 708 from an aft end 254 of the main wing element 706. Alternatively or additionally, the air is ejected into the slot 708 from a forward end 252 of the flap 704. Accordingly, aerodynamic airflow for aircraft 700 is improved by injecting air into slot 708 using air which may otherwise have been wasted or contributed to reduced aerodynamic performance.

Although specific embodiments were described herein, the scope is not limited to those specific embodiments. Rather, the scope is defined by the following claims and any equivalents thereof.

The invention claimed is:

1. A wing of an aircraft, the wing comprising:
a flap disposed on an aft end of the wing;
an air duct configured to transport air in a spanwise direction along a leading edge of the wing from an air supply source of the aircraft;
a discharge duct, disposed within the wing, configured to transport the air in an aft direction from the air duct to the aft end of the wing; and
one or more nozzles, coupled with an aft end of the discharge duct, disposed on the aft end of the wing and configured to increase lift and to reduce drag for the wing by accelerating the air from the discharge duct into a slot between the wing and the flap.

2. The wing of claim 1 wherein:
the air supply source is one of a wing anti-ice system, an auxiliary power unit, an engine anti-ice system, an engine bleed, and a cabin air compressor.

3. The wing of claim 1 further comprising:
a compressor coupled with the discharge duct and configured to accelerate the air toward the slot.

4. The wing of claim 1 further comprising:
a nozzle manifold configured to transport the air from the discharge duct to multiple nozzles at the aft end.

5. The wing of claim 1 further comprising:
a flexible duct section configured to transport the air from the air duct to the discharge duct.

6. The wing of claim 1 wherein:
the wing is devoid of openings on top and bottom surfaces of the wing that disrupt laminar flow of the wing.

7. The wing of claim 6 wherein:
the one or more nozzles accelerate the air into the slot to compensate for a shortfall in aerodynamic performance of a drooped configuration without disrupting laminar flow along a surface of the wing.

8. A wing including a slot between a main wing element and a flap, the wing comprising:
an inlet port, disposed within the slot, configured to suction a viscous layer of a lower surface of the wing;
a compressor configured to pressurize air suctioned by the inlet port; and
an ejection port, disposed within the slot, configured to increase lift and to reduce drag for the wing by ejecting the pressurized air into the slot,
wherein the flap is disposed on an aft end of the wing.

9. The wing of claim 8 wherein
the inlet port and the ejection port are disposed at the aft end of the main wing element.

10. The wing of claim 8 wherein
the inlet port and the ejection port are disposed at a forward end of the flap.

11. The wing of claim 8 wherein:
a first inlet port and a first ejection port are disposed at the aft end of the main wing element, and
a second inlet port and a second ejection port are disposed at a forward end of the flap.

12. The wing of claim 8 wherein:
the ejection port is configured to accelerate the air into the slot in an upward direction.

13. The wing of claim 8 wherein:
the inlet port is disposed at the aft end of the main wing element,
the compressor is disposed in the flap,
the compressor and the ejection port are disposed at a forward end of the flap, and
the wing further includes a bridging duct configured to transport the air across the slot from the inlet port to the compressor.

14. The wing of claim 13 wherein:
the bridging duct is disposed within an aft-element support strut extending across the slot between the main wing element and the flap.

15. A method of improving aerodynamic airflow for a wing of an aircraft, the method comprising:
receiving, in an air duct disposed within an interior of the wing, air from an air source supply; transporting the air within the wing toward an ejection port disposed at a surface within a slot between a main wing element and a flap, wherein the flap is disposed on an aft end of the wing; and
increasing lift and reducing drag of the wing by ejecting the air into the slot.

16. The method of claim 15 wherein transporting the air toward the ejection port comprises:
transporting the air with a discharge duct in an aft direction from an air supply source of the aircraft toward the aft end of the main wing element.

17. The method of claim 16 wherein:
the air supply source is one of a wing anti-ice system, an auxiliary power unit, an engine anti-ice system, an engine bleed, and a cabin air compressor.

18. The method of claim 15 wherein transporting the air toward the ejection port comprises:
suctioning air from the slot with an inlet port; and
accelerating the air with a compressor toward an ejection port.

19. The method of claim 18 wherein ejecting the air comprises:
ejecting the air into the slot from the aft end of the main wing element.

20. The method of claim 18 wherein ejecting the air comprises:
ejecting the air into the slot from a forward end of the flap.

* * * * *